(No Model.)
F. D. ZIMMERMAN & F. BEALL.
STEAMER OR HEATER FOR TEMPERING WHEAT OR OTHER GRAIN.
No. 460,624. Patented Oct. 6, 1891.
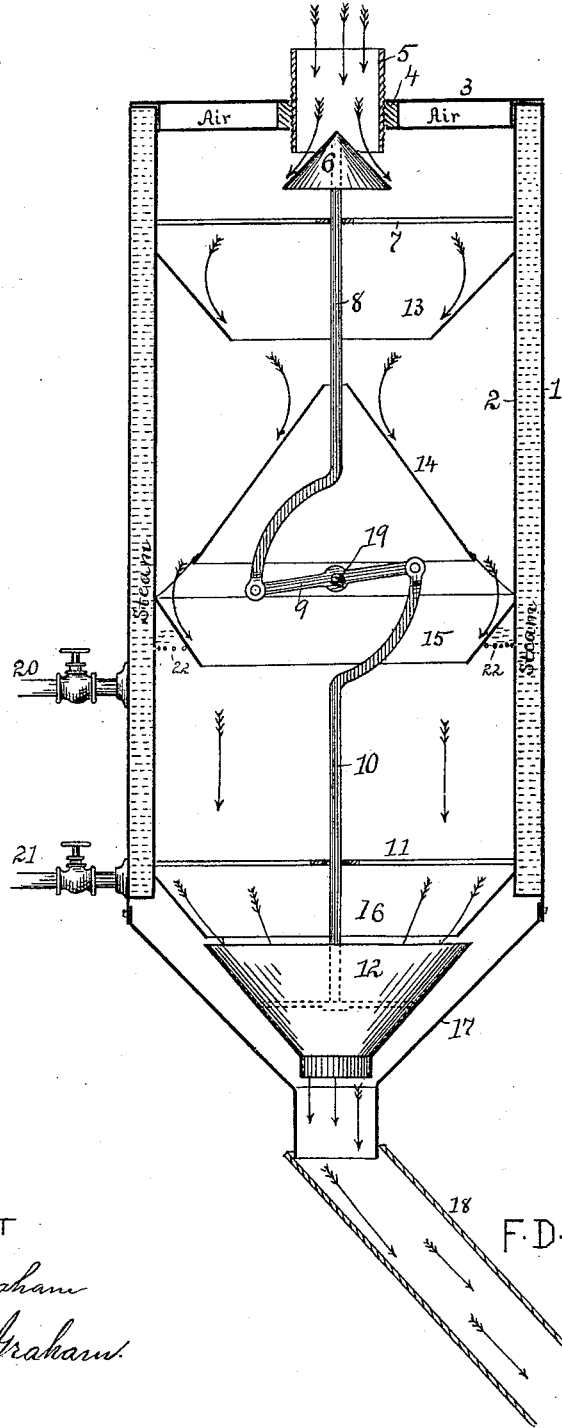
ATTEST
Helen Graham
William Graham
INVENTORS
F. D. Zimmerman and
Frank Beall.
By their attorney
L. P. Graham.

UNITED STATES PATENT OFFICE.

FREDERICK D. ZIMMERMAN AND FRANK BEALL, OF MINNEAPOLIS, MINNESOTA, ASSIGNORS OF ONE-THIRD TO HUGH CREA, OF DECATUR, ILLINOIS.

STEAMER OR HEATER FOR TEMPERING WHEAT OR OTHER GRAIN.

SPECIFICATION forming part of Letters Patent No. 460,624, dated October 6, 1891.

Application filed March 12, 1891. Serial No. 384,819. (No model.)

*To all whom it may concern:*

Be it known that we, FREDERICK D. ZIMMERMAN and FRANK BEALL, of Minneapolis, in the county of Hennepin and State of Minnesota, have invented certain new and useful Improvements in Steamers or Heaters for Tempering Wheat or other Grain, of which the following is a specification.

In steamers or heaters for wheat or other grain, as at present constructed, the difficulty is that when the rolls diminish in feed or the bin becomes filled, as the case may be, the grain backs up into the steamer and is cooked or baked.

The object of our invention is to overcome this difficulty and to more evenly and thoroughly steam or heat the grain. We attain the first result by placing a valve-regulator in the lower end of the heater, suspended above the discharge-opening, and so connecting such regulator with the inlet-valve that when the grain backs slightly above the regulator the weight and motion of the grain force the regulator downward and close the valve. We attain the second result by a set of inclines, funnel-formed and cone-formed, which scatter the grain and extend the distance of its travel, thus subjecting it longer to the steam or heat.

In the drawing accompanying and forming a part of this specification, 1 represents in vertical section an outer cylinder, and 2 an inner cylinder, the space between the two walls being used as a steam-jacket. The lid 3 has double walls, which inclose an air-cavity, and also has a threaded collar 4, into which the threaded inlet-tube 5 is screwed and adjusted. The conical valve 6 is adapted to the opening of the inlet-tube, and is held more or less distant from the same by means that will hereinafter appear. The rod 8 carries the conical valve on its upper end, and it has a guide-bearing in a hole in the center of spider 7. The lever 9 is pivoted midway between its ends on rod 19, and it is pivotally connected at one end with rod 8 and at the other end with rod 10. The funnel-formed valve-regulator 12 is carried by rod 10 some distance above the discharge-opening. Spider 11 has a central opening, which provides a guide-bearing for rod 10. The funnel 13 forms an incline on which the grain falls from cone 6. Cone 14 receives the grain from funnel 13 and delivers it to funnel 15, and funnel 16 guides the grain to the funnel-formed valve-regulator, through which and the hopper 17 it passes to discharge-chute 18. The hopper 17 is secured to the heater by means of a bayonet-catch, or is otherwise detachably connected, in order to give ready access to the valve-regulator. Pipe 20 supplies steam to the heater, and pipe 21 permits the water resulting from condensed steam to be drawn off. Holes 22 supply steam from the jacket to the interior of the heater. The arrows illustrate the direction of the grain through the heater.

In operation the tube 5 is adjusted the required distance from cone 6 to supply the proper amount of grain, and the grain so supplied falls from one incline to another, being subjected meantime to the steam or heat, while in a scattered condition, and finally passes from the heater through chute 18 to rolls or to a bin, as the case may be. If rolls are being supplied and their feed diminishes from any cause, or if the grain is run into a bin and the bin becomes filled, grain will back up in the chute and the heater until the regulator 12 is more or less covered, when such regulator will descend and force the valve 6 upward by means of the rods and lever until the inlet is closed sufficiently to correspond to the changed discharge-flow. As soon as the grain flows freely from the heater, the relieved regulator will rise and permit the conical valve to open completely, as indicated in the drawing.

The valve is to be weighted to raise and hold the regulator, or rod 8 may be weighted, or the left end of the lever, or the pivot may be set to the right of the center of the lever and the same result—*i. e.*, the raising of the regulator—be accomplished.

It is essential that the regulator shall have inclined surfaces and be adapted to normally permit the passage of grain, otherwise its form is unimportant and it may be conical, for instance, as well as funnel-shaped.

The device, as shown, is particularly adapted for use as a steamer. In order to heat the grain without steaming it the openings 22, which extend around the inner cylinder, are closed, and in addition to this the scattering-inclines may advantageously be made hollow and supplied with steam.

We claim—

1. In steamers or heaters for tempering wheat or other grain, the combination of a steaming or heating compartment, a valve to admit grain to the compartment, a valve-regulator suspended in the discharge end of the compartment, and a connection between the regulator and the inlet-valve adapted to be actuated by the descent of the regulator and to regulate or prevent the flow of grain into the steaming or heating compartment, as set forth.

2. In steamers or heaters for tempering wheat or other grain, the combination of a steaming or heating compartment, a lever in the compartment pivoted between its ends, an inlet-valve sustained from one end of the lever, and a valve-regulator suspended in the discharge end of the compartment from the opposite end of the lever, as set forth.

3. In steamers or heaters for tempering wheat or other grain, the combination of a steaming or heating compartment, a lever in the compartment pivoted between its ends, a rod extending upward from one end of the lever and sustaining an inlet-valve, a rod extending downward from the opposite end of the lever and carrying a valve-regulator in the discharge end of the compartment, and spiders having central openings acting as guide-bearings for the rods, as set forth.

4. In steamers or heaters for tempering wheat or other grain, the combination of a steaming or heating compartment, a lever pivoted between its ends, a rod extending upward from one end of the lever and sustaining an inlet-valve, a rod extending downward from the opposite end of the lever and carrying a valve-regulator in the discharge end of the compartment, and a threaded tube adapted to be screwed more or less nearly in contact with the inlet-valve, as set forth.

In testimony whereof we sign our names in the presence of two subscribing witnesses.

FREDERICK D. ZIMMERMAN.
FRANK BEALL.

Attest:
A. Y. DAVIDSON,
E. A. MERRILL.